United States Patent
Han et al.

(10) Patent No.: US 9,307,518 B2
(45) Date of Patent: *Apr. 5, 2016

(54) METHOD AND APPARATUS FOR COMMUNICATING WITH BASE STATION BASED ON SPEED OF USER EQUIPMENT IN MOBILE COMMUNICATION SYSTEM

(71) Applicant: Samsung Electronics Co., Ltd., Gyeonggi-do (KR)

(72) Inventors: Jin-Kyu Han, Seoul (KR); Youn-Sun Kim, Gyeonggi-do (KR); Ju-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 41 days.

This patent is subject to a terminal disclaimer.

(21) Appl. No.: 14/675,069

(22) Filed: Mar. 31, 2015

(65) Prior Publication Data

US 2015/0208377 A1    Jul. 23, 2015

Related U.S. Application Data

(63) Continuation of application No. 13/296,869, filed on Nov. 15, 2011, now Pat. No. 9,014,701.

(30) Foreign Application Priority Data

Nov. 15, 2010    (KR) .................. 10-2010-0113600

(51) Int. Cl.
*H04W 36/00* (2009.01)
*H04W 64/00* (2009.01)
(Continued)

(52) U.S. Cl.
CPC ............ *H04W 64/006* (2013.01); *H04W 36/32* (2013.01); *H04W 48/20* (2013.01); *H04W 36/0083* (2013.01); *H04W 64/00* (2013.01); *H04W 88/02* (2013.01)

(58) Field of Classification Search
USPC ............... 455/436–444, 68–69, 450–451, 455/452.1–452.2, 67.11, 67.13, 455/67.14–67.16; 370/329–333
See application file for complete search history.

(56) References Cited

U.S. PATENT DOCUMENTS 5,513,380 A * 4/1996 Ivanov et al. .............. 455/441
6,192,245 B1 * 2/2001 Jones et al. ................ 455/437
(Continued)

FOREIGN PATENT DOCUMENTS

CN    101170830    4/2008
CN    101801049    8/2010
(Continued)

OTHER PUBLICATIONS

Chinese Office Action dated Jun. 1, 2015 issued in counterpart application No. 201180054922.5, 13 pages.

*Primary Examiner* — Tuan A Tran
(74) *Attorney, Agent, or Firm* — The Farrell Law Firm, P.C.

(57) ABSTRACT

Methods and apparatuses are provided for performing communication by a UE in a mobile communication system. A speed of the UE is measured by using an acceleration sensor in the UE. The UE determines that a change of the measured speed is detected in accordance with a predetermined criteria. The UE transmits information about the measured speed to a serving base station if the change of the measured speed is detected. Information about a target cell determined by the serving base station based on the measured speed is received from the serving base station. A handover procedure to the target cell is performed in response to receiving the information about the target cell.

6 Claims, 4 Drawing Sheets

(51) Int. Cl.
*H04W 36/32* (2009.01)
*H04W 48/20* (2009.01)
*H04W 88/02* (2009.01)

(56) References Cited

U.S. PATENT DOCUMENTS

| | | | |
|---|---|---|---|
| 6,208,863 B1 | 3/2001 | Salonaho | |
| 6,256,500 B1 * | 7/2001 | Yamashita | 455/441 |
| 8,588,790 B2 * | 11/2013 | Cho et al. | 455/444 |
| 2004/0029588 A1 | 2/2004 | Kikuma et al. | |
| 2009/0247162 A1 * | 10/2009 | Yasuoka et al. | 455/436 |
| 2010/0113036 A1 | 5/2010 | Cho et al. | |
| 2011/0051687 A1 | 3/2011 | Nakasato | |
| 2011/0194515 A1 | 8/2011 | Nakao et al. | |

FOREIGN PATENT DOCUMENTS

| | | |
|---|---|---|
| JP | 09-051571 | 2/1997 |
| JP | 09-200858 | 7/1997 |
| JP | 2004-048528 | 2/2004 |
| JP | 2006-005597 | 1/2006 |
| JP | 2007-227996 | 9/2007 |
| JP | 2009-182413 | 8/2009 |
| KR | 10-2005-0017514 | 2/2005 |
| WO | WO 2006/128479 | 12/2006 |
| WO | WO 2010/016222 | 2/2010 |

* cited by examiner

METHOD AND APPARATUS FOR COMMUNICATING WITH BASE STATION BASED ON SPEED OF USER EQUIPMENT IN MOBILE COMMUNICATION SYSTEM

PRIORITY

This application is a Continuation Application of U.S. application Ser. No. 13/296,869, which was filed in the U.S. Patent and Trademark Office on Nov. 15, 2011, and claims priority under 35 U.S.C. §119(a) to a Korean Patent Application Serial No. 10-2010-0113600, which was filed in the Korean Intellectual Property Office on Nov. 15, 2010, the entire content of each of which is incorporated herein by reference.

BACKGROUND OF THE INVENTION

1. Field of the Invention

The present invention relates generally to a method and apparatus for a communication procedure in a wireless communication system, and more particularly, to a method and apparatus for using the speed of a User Equipment (UE) or a Mobile Station (MS) for a communication procedure for selecting a cell in a wireless communication system.

2. Description of the Related Art

Recently, wireless communication systems have evolved to more miniaturize cells to support a high data rate for UEs with high mobility. Accordingly, micro cells and macro cells may coexist in the same area, and the overall system performance may significantly depend on the cell types to which the UEs are connected.

FIG. 1 illustrates a conventional wireless mobile communication system in which micro cells and a macro cell coexist. In the following description, the terms 'cell' and 'Node B (or Base Station)' will have the same meaning.

Referring to FIG. 1, a plurality of micro cells 110, 120, 130, 140, 150 and 160 are present in a macro cell 100. In the wireless communication system, however, the micro cells 110, 120, 130, 140, 150 and 160 should not necessarily be located within the macro cell 100, and may be present out of the macro cell 100.

The moving speed of a UE may be high or low within the service coverage. Reference numeral 170 represents a UE moving at low speed, while reference numeral 180 represents a UE moving at high speed.

The UE 170 moving at low speed is highly likely to be located in a micro cell represented by reference numeral 130 for a considerable time, so it is preferable that the micro cell 130, rather than the macro cell 100, is a serving cell for the UE 170. However, the UE 180 moving at high speed will be located in its current micro cell 120 for a short period of time. Due to this high speed movement, if the micro cell 120 is determined as a serving cell for the UE 180, a handover procedure may frequently occur. Thus, it would be more efficient for the macro cell 100, rather than the micro cell 120, to be a serving cell for the UE 180. In other words, the efficiency of the system may be improved by determining the cell providing a service to a UE, based on the moving speed of the UE.

In the conventional mobile communication system, a UE or a Node B estimates a channel and the speed of the UE depending on the estimated channel, and determines a target cell or serving cell to which the UE will perform handover, based on the estimated speed of the UE. However, this scheme of estimating the speed of a UE by the channel estimation tends to be inaccurate.

SUMMARY OF THE INVENTION

Aspects of the present invention are to provide methods and apparatuses for performing a communication procedure based on the speed measured by a UE, a Node B-led handover procedure based on the speed measured by a UE, a UE-led handover procedure based on the speed measured by a UE, a random access procedure based on the speed measured by a UE, and an initial negotiation procedure with a Node B based on the speed measured by a UE.

In accordance with an aspect of the present invention, a method is provided for performing communication by a UE in a mobile communication system. A speed of the UE is measured by using an acceleration sensor in the UE. The UE determines that a change of the measured speed is detected in accordance with a predetermined criteria. The UE transmits information about the measured speed to a serving base station if the change of the measured speed is detected. Information about a target cell determined by the serving base station based on the measured speed is received from the serving base station. A handover procedure to the target cell is performed in response to receiving the information about the target cell.

In accordance with another aspect of the present invention, a method is provided for performing communication by a UE in a mobile communication system. A speed of the UE is measured by using an acceleration sensor in the UE. A serving cell is determined based on the measured speed. A random access procedure is performed to a base station of the serving cell. A type of the serving cell is determined based on a comparison between the measured speed and a threshold, the type of the serving cell being one of a micro cell and a macro cell.

In accordance with another aspect of the present invention, a method is provided for performing communication by a UE in a mobile communication system. A speed of the UE is measured by using an acceleration sensor in the UE. UE capability information including the measured speed is generated. The UE capability information is transmitted to a serving base station. An initial negotiation procedure is performed with the serving base station based on the measured speed.

In accordance with another aspect of the present invention, a UE is provided for performing communication in a network. The UE includes a speed measurer configured to measure a speed of the UE by using an acceleration sensor. The UE also includes a controller configured to determining that a change of the measured speed is detected in accordance with a predetermined criteria, to transmit information about the measured speed to a serving base station if the change of the measured speed is detected, to receive, from the serving base station, information about a target cell determined by the serving base station based on the measured speed, and to perform a handover procedure to the target cell.

In accordance with another aspect of the present invention, a UE is provided for performing communication in a network. The UE includes a speed measurer configured to measure a speed of the UE by using an acceleration sensor. The UE also includes a controller configured to determining a serving cell based on the measured speed, and to perform a random access procedure to a base station of the serving cell. A type of the serving cell is determined based on a comparison between the measured speed and a threshold, the type of the serving cell being one of a micro cell and a macro cell.

In accordance with another aspect of the present invention, a UE is provided for performing communication in a network. The UE includes a speed measurer configured to measure a speed of the UE. The UE also includes a controller configured to generate UE capability information including the measured speed, to transmit the UE capability information to a serving base station, and to perform an initial negotiation procedure with the serving base station based on the measured speed.

BRIEF DESCRIPTION OF THE DRAWINGS

The above and other aspects, features, and advantages of embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Embodiments of the present invention will now be described in detail with reference to the annexed drawings. In the following description, a detailed description of known functions and configurations incorporated herein has been omitted for the sake of clarity and conciseness. Terms used herein are defined based on functions in the present invention and may vary according to users' intentions or practices.

In the present invention, a UE measures its speed and performs a communication procedure based on the measured speed. The communication procedure may include, for example, a Node B-led handover procedure, a UE-led handover procedure, a random access procedure, and an initial negotiation procedure with a Node B.

It is determined which of the two different types of handover procedures the UE will use by the presetting corresponding to termination of the Node B's communication or termination of the UE's communication, or a Node B may determine a type of the handover procedure and inform a UE of the determined handover procedure.

Figure 1:
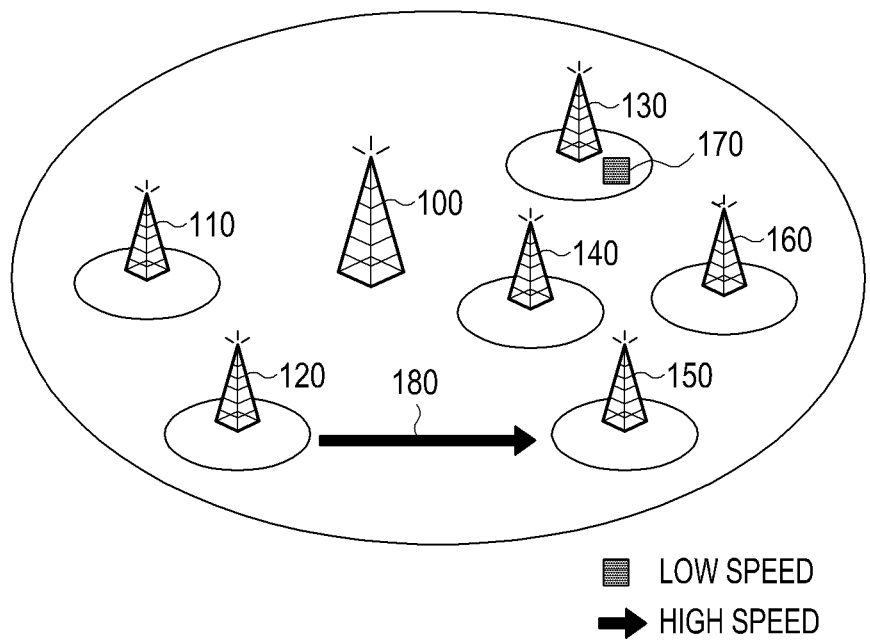
FIG. 1 illustrates a wireless mobile communication system in which micro cells and a macro cell coexist, according to the prior art.
Figure 2:
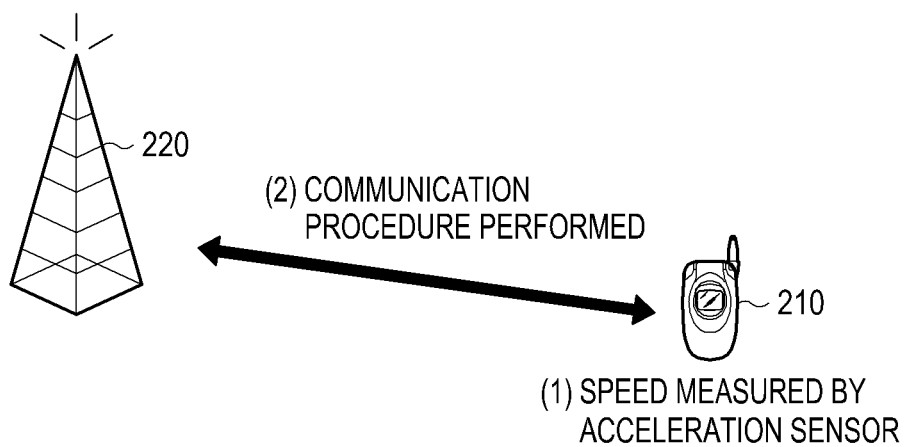
FIG. 2 illustrates a basic concept of the present invention.

FIG. 2 illustrates the basic concept of the present invention.

It is assumed herein that a UE 210 is capable of measuring its own speed. The speed may include acceleration. For example, if the UE 210 has an acceleration sensor to measure its speed, the UE 210 measures its speed using an acceleration sensor in step (1). Thereafter, the UE 210 performs a communication procedure with a Node B 220 based on the measured speed in step (2).

Various embodiments of the present invention will now be described below, and should not necessarily be performed independently. All or some components thereof may be interoperable.

In the Node B-led handover procedure corresponding to a first embodiment of the present invention, if a UE measures its speed and feeds back (or reports) the measured speed information to a serving Node B, the serving Node B may determine a target Node B by considering the speed of the UE, and perform a handover procedure.

In the UE-led handover procedure corresponding to a second embodiment of the present invention, a UE may measure its speed, determine a target cell by considering the measured speed, report the determined target cell to the current serving Node B by the measurement report, and perform a handover procedure.

In the random access procedure corresponding to a third embodiment of the present invention, a UE may measure its speed, determine a serving cell by considering the measured speed, and perform a random access procedure to the determined serving cell.

In the initial negotiation procedure with a Node B corresponding to a fourth embodiment of the present invention, a UE may measure its speed, insert the measured speed information into UE capability information, report the UE capability information to the serving cell, and perform initial negotiation with the serving cell.

Figure 3:
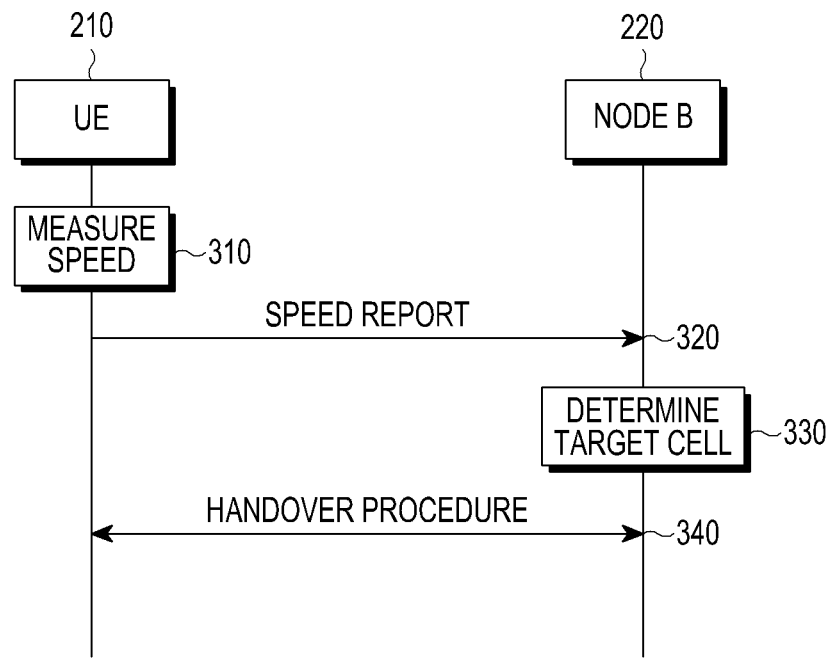
FIG. 3 illustrates a handover procedure according to a first embodiment of the present invention.

FIG. 3 illustrates a handover procedure according to a first embodiment of the present invention.

FIG. 3 corresponds to the Node B-led handover procedure, wherein if a UE measures its speed and reports the measured speed to a serving Node B, the serving Node B performs a handover procedure based on the measured speed.

In step 310, a UE 210 measures its speed using, for example, an acceleration sensor.

In step 320, the UE 210 reports the measured speed by transmitting the measured speed to a serving Node B 220. The speed measurement in step 310 and the speed report in step 320 may be performed periodically or aperiodically.

In the case of the periodic speed measurement and report, a period of the speed measurement and report may be determined in advance between the UE 210 and the serving Node B 220. The serving Node B 220 may provide the UE 210 with information about the period of the speed measurement and report.

In the case of the aperiodic speed measurement and report, timing of the speed measurement and report may be determined by the UE 210. For example, upon detecting a change in speed in accordance with criteria while monitoring its speed, the UE 210 may report its speed to the serving Node B 220. Timing of the speed measurement and report may be determined by the serving Node B 220. In this case, the serving Node B 220 may send a speed report request message to the UE 210 in a traffic channel or a separate control channel.

In step 330, the Node B 220 determines a target cell by considering the speed of the UE 210. In this step, the serving Node B 220 may use a method of setting a threshold. For example, if the speed of the UE 210 is less than or equal to a threshold, the Node B 220 may determine a micro cell as a target cell, and if the speed of the UE 210 is greater than the threshold, the Node B 220 may determine a macro cell as a target cell.

In step 340, the Node B 220 performs a handover procedure with the UE 210 to hand over the UE 210 to the determined target cell. The handover procedure, a well-known procedure in the art, may be performed in various manners. However, as this is not the main subject of the present invention, a detailed description thereof will be omitted.

Figure 4:
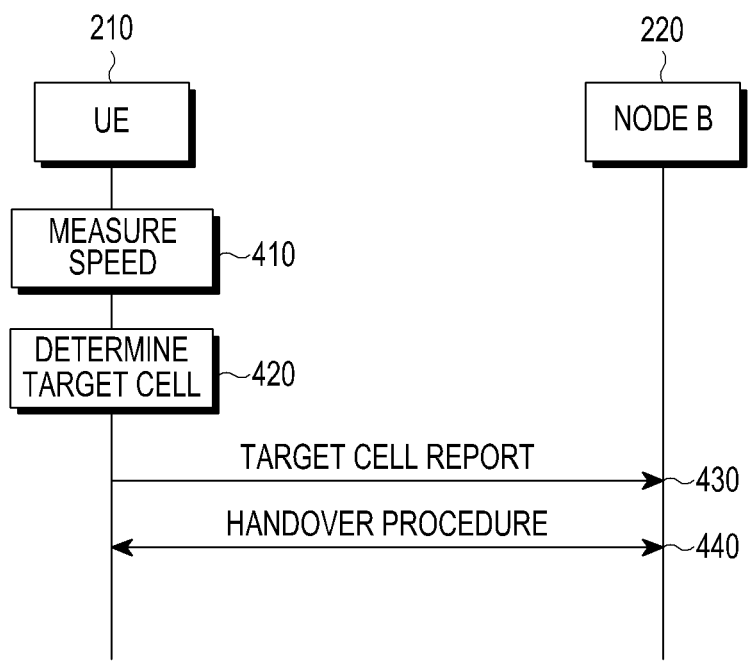
FIG. 4 illustrates a handover procedure according to a second embodiment of the present invention.

FIG. 4 illustrates a handover procedure according to a second embodiment of the present invention.

FIG. 4 corresponds to the UE-led handover procedure, wherein if a UE measures its speed, determines a target cell by considering the measured speed, and reports the determined target cell to the current serving Node B, Node B performs a handover procedure based on the measured speed.

In step 410, a UE 210 measures its speed using, for example, an acceleration sensor.

In step 420, the UE 210 determines a target cell by considering the measured speed. In this step, the UE 210 may use a method of setting a threshold. For example, if the speed of the UE 210 is less than or equal to a threshold, the Node B 220 may determine a micro cell as a target cell, and if the speed of the UE 210 is greater than the threshold, the Node B 220 may determine a macro cell as a target cell.

In step 430, the UE 210 reports information about the determined target cell to the current serving Node B 220, which information may be transmitted in a traffic channel or a separate control channel.

In step 440, the serving Node B 220 performs a handover procedure with the UE 210 to hand over the UE 210 to the target cell. The handover procedure, a well-known procedure in the art, may be performed in various manners. However, as this is not the main subject of the present invention, a detailed description thereof will be omitted.

Figure 5:
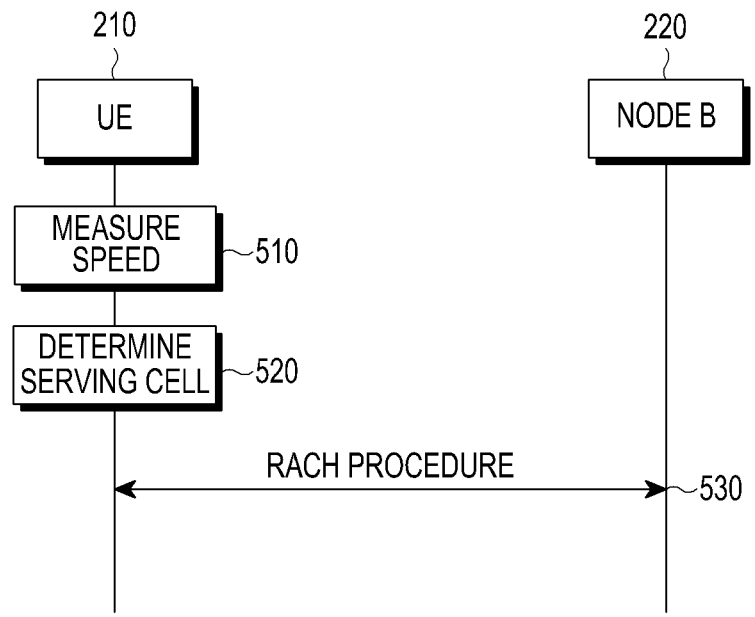
FIG. 5 illustrates a random access procedure according to a third embodiment of the present invention.

FIG. 5 illustrates a random access procedure according to a third embodiment of the present invention.

In FIG. 5, a UE measures its speed, determines a serving cell by considering the measured speed, and performs a random access procedure to the serving cell.

In step 510, the UE 210 measures its speed using, for example, an acceleration sensor.

In step 520, the UE 210 determines a serving cell by considering the measured speed. In this step, the UE 210 may use a method of setting a threshold. For example, if the speed of the UE 210 is less than or equal to a threshold, the Node B 220 may determine a micro cell as a serving cell, and if the speed of the UE 210 is greater than the threshold, the Node B 220 may determine a macro cell as a service cell.

In step 530, the UE 210 performs a random access procedure with the determined serving Node B 220. The random access procedure, a well-known procedure in the art, may be performed in various manners. However, as this is not the main subject of the present invention, a detailed description thereof will be omitted.

Figure 6:
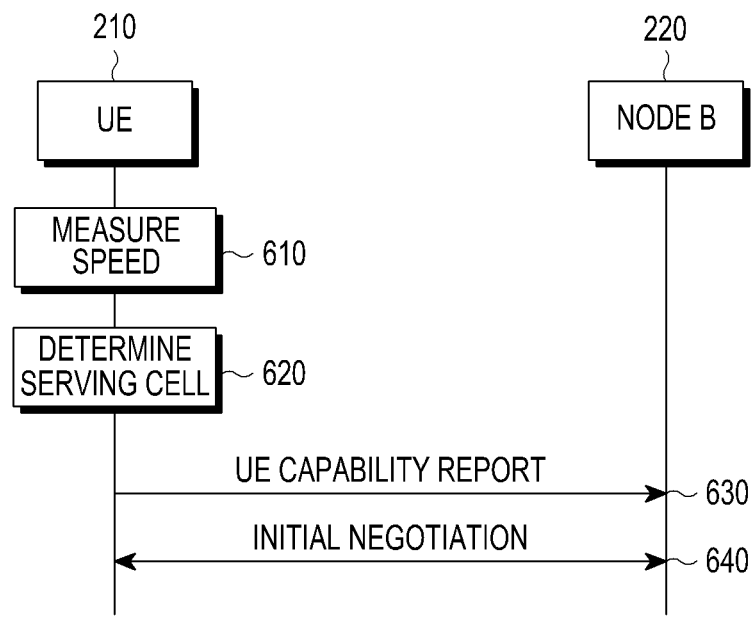
FIG. 6 illustrates an initial negotiation procedure according to a fourth embodiment of the present invention.

FIG. 6 illustrates an initial negotiation procedure according to a fourth embodiment of the present invention.

In FIG. 6, a UE measures its speed, inserts the measured speed information into UE capability information, transmits the UE capability information to a serving cell, and performs initial negotiation with the serving cell.

In step 610, a UE 210 measures its speed using, for example, an acceleration sensor.

In step 620, the UE 210 inserts information about the measured speed into UE capability information. The UE capability information, including information such as a data rate of the UE 210, is used for initial negotiation with a serving Node B 220.

In step 630, the UE 210 transmits the UE capability information including information about the measured speed to the serving Node B 220.

In step 640, the UE 210 and the Node B 220 perform an initial negotiation procedure by considering the information about the measured speed. The initial negotiation procedure, a well-known procedure in the art, may be performed in various manners. However, as this is not the main subject of the present invention, a detailed description thereof will be omitted.

Figure 7:
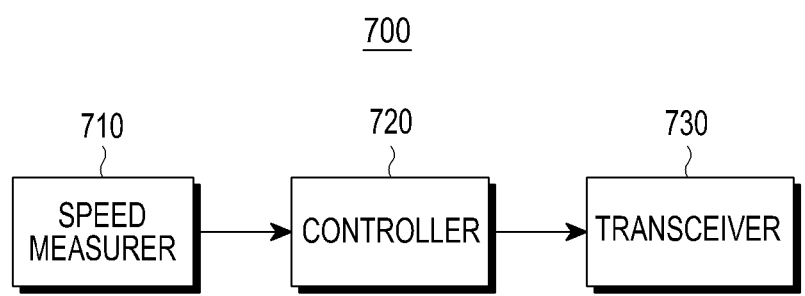
FIG. 7 illustrates a structure of a UE according to an embodiment of the present invention.

FIG. 7 illustrates a structure of a UE according to an embodiment of the present invention.

In FIG. 7, a UE 700 includes a speed measurer 710, a controller 720 and a transceiver 730.

The speed measurer 710 measures speed of the UE 700, and delivers the measured speed of the UE 700 to the controller 720. Although the speed measurer 710 may employ a method of measuring the speed of the UE 700 using an acceleration sensor, the speed measurement is not limited to the acceleration sensor-based speed measurement.

The controller 720 transmits information about the measured speed of the UE 700 to a Node B via the transceiver 730. Thereafter, the controller 720 performs communication procedures with the Node B based on the information about the speed of the UE 700.

An operation of the controller 720 may vary depending on embodiments of the present invention.

A description will now be made of an operation of the controller 720 in the Node B-led handover procedure corresponding to the first embodiment of the present invention.

When a UE measures its speed and reports the measured speed to a serving Node B, the serving Node B performs a handover procedure based on the measured speed.

The controller 720 transmits the measured speed to the serving Node B via the transceiver 730. The speed measurement and report may be performed periodically or aperiodically.

In the case of periodic speed measurement and report, a period of the speed measurement and report may be determined in advance between the UE 700 and the Node B. The Node B may provide the UE 700 with information about the period of the speed measurement and report.

In the case of aperiodic speed measurement and report, timing of the speed measurement and report may be determined by the controller 720. For example, upon detecting a change in speed in accordance with criteria while monitoring the speed of the UE 700 measured by the speed measurer 710, the controller 720 may report the speed to the serving Node B. Timing of the speed measurement and report may be determined by the serving Node B. In this case, the controller 720 may receive a speed report request message from the serving Node B, control the speed measurer 710 based thereon, and report the control results to the serving Node B. The speed report request message may be received in a traffic channel or a separate control channel. Thereafter, the controller 720 performs a handover procedure with the Node B to the target cell that the serving Node B has determined by considering the speed of the UE 700.

A description will now be made of an operation of the controller 720 in the UE-led handover procedure corresponding to the second embodiment of the present invention.

When a UE measures its speed, determines a target cell by considering the measured speed, and reports the determined target cell to the current serving Node B, the serving Node B performs a handover procedure based on the measured speed.

The controller 720 determines a target cell in consideration of the measured speed, by using a method of setting a threshold. For example, if the speed of the UE 700 is less than or equal to a threshold, the controller 720 may determine a micro cell as a target cell, and if the speed of the UE 700 is greater than the threshold, the controller 720 may determine a macro cell as a target cell. The controller 720 reports information about the determined target cell to the current serving Node B via the transceiver 730, which information may be transmitted in a traffic channel or a separate control channel. Thereafter, the controller 720 performs a handover procedure with the serving Node B to be handed over to the target cell.

A description will now be made of an operation of the controller 720 in the random access procedure corresponding to the third embodiment of the present invention.

In the third embodiment, a UE measures its speed, determines a serving cell by considering the measured speed, and performs a random access procedure to the serving cell.

The controller 720 determines a serving cell in consideration of the measured speed, by using a method of setting a threshold. For example, if the speed of the UE 700 is less than or equal to a threshold, the controller 720 may set a micro cell as a serving cell, and if the speed of the UE 700 is greater the threshold, the controller 720 may determine a macro cell as a serving cell. Thereafter, the controller 720 performs a random access procedure with the determined serving Node B.

A description will now be made of an operation of the controller 720 in the initial negotiation procedure between a UE and a Node B corresponding to the fourth embodiment of the present invention.

In the fourth embodiment, a UE measures its speed, inserts the measured speed into UE capability information, transmits the UE capability information to a serving cell, and performs initial negotiation with the serving cell.

The controller 720 inserts information about the measured speed into the UE capability information. The UE capability information, including information such as a data rate of the UE 700, is used for initial negotiation with a Node B. Thereafter, the controller 720 transmits the UE capability information including the information about the measured speed to the Node B via the transceiver 730. Thereafter, the controller 720 performs an initial negotiation procedure with the Node B by considering the information about the measured speed.

As is apparent from the foregoing description, the present invention performs several communication procedures based on the speed measured by a UE, making it possible to select a target Node B during handover, select a serving Node B during random access, and perform initial negotiation with a Node B, based on the accurate speed of the UE. As a result, the communication procedures are performed based on the accurate status of the UE, thereby increasing system efficiency.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for performing communication by a user equipment (UE) in a mobile communication system, the method comprising:
    measuring a speed of the UE by using an acceleration sensor in the UE;
    determining, by the UE, that a change of the measured speed is detected in accordance with a predetermined criteria;
    transmitting, by the UE, information about the measured speed to a serving base station if the change of the measured speed is detected;
    receiving, from the serving base station, information about a target cell determined by the serving base station based on the measured speed; and
    performing a handover procedure to the target cell in response to receiving the information about the target cell.

2. The method of claim 1, wherein a type of the target cell is determined based on a comparison between the measured speed and a threshold, the type of the target cell being one of a micro cell and a macro cell.

3. The method of claim 1, further comprising:
    measuring a speed of the UE by using an acceleration sensor in the UE prior to connecting with the serving base station;
    generating UE capability information including the measured speed;
    transmitting the UE capability information to the serving base station; and
    performing an initial negotiation procedure with the serving base station based on the measured speed.

4. A user equipment (UE) for performing communication in a network, the UE comprising:
    a speed measurer configured to measure a speed of the UE by using an acceleration sensor; and
    a controller configured to determining that a change of the measured speed is detected in accordance with a predetermined criteria, to transmit information about the measured speed to a serving base station if the change of the measured speed is detected, to receive, from the serving base station, information about a target cell determined by the serving base station based on the measured speed, and to perform a handover procedure to the target cell.

5. The UE of claim 4, wherein a type of the target cell is determined based on a comparison between the measured speed and a threshold, the type of the target being one.

6. The UE of claim 4, wherein the speed measurer is further configured to measure a speed of the UE prior to connecting with the serving base station, and
    wherein the controller is further configured to generate UE capability information including the measured speed, to transmit the UE capability information to the serving base station, and to perform an initial negotiation procedure with the serving base station based on the measured speed.

* * * * *